United States Patent
Oka et al.

(10) Patent No.: US 11,541,580 B2
(45) Date of Patent: Jan. 3, 2023

(54) METHOD FOR PREPARING COMPACT OF RESIN COMPOUND HAVING ANISOTROPY

(71) Applicants: NIIGATA UNIVERSITY, Niigata (JP); SHIN-ETSU CHEMICAL CO., LTD., Tokyo (JP)

(72) Inventors: Tetsuo Oka, Niigata (JP); Yoshinori Takamatsu, Annaka (JP); Takeshi Fukuda, Tokyo (JP)

(73) Assignees: NIIGATA UNIVERSITY, Niigata (JP); SHIN-ETSU CHEMICAL CO., LTD., Tokyo (JP)

(*) Notice: Subject to any disclaimer, the term of this patent is extended or adjusted under 35 U.S.C. 154(b) by 873 days.

(21) Appl. No.: 16/396,199

(22) Filed: Apr. 26, 2019

(65) Prior Publication Data

US 2019/0329461 A1    Oct. 31, 2019

(30) Foreign Application Priority Data

Apr. 27, 2018  (JP) .............................. JP2018-086770

(51) Int. Cl.
*B29C 35/08*     (2006.01)
*B29C 43/56*     (2006.01)
(Continued)

(52) U.S. Cl.
CPC .............. *B29C 43/56* (2013.01); *B29C 35/08* (2013.01); *B29C 43/003* (2013.01); *C08K 3/04* (2013.01);
(Continued)

(58) Field of Classification Search
CPC ....... B29C 43/46; B29C 43/003; B29C 35/08; B29C 2043/568; B29K 2063/00;
(Continued)

(56) References Cited

U.S. PATENT DOCUMENTS

| 7,090,478 B2 | 8/2006 | Wada et al. |
| 2015/0290850 A1 | 10/2015 | Takemoto |

FOREIGN PATENT DOCUMENTS

| EP | 240420 A | * 10/1987 | ........... H01F 41/028 |
| JP | 2000-140936 A | 5/2000 | |

(Continued)

OTHER PUBLICATIONS

Office Action dated Nov. 24, 2021, in Japanese Patent Application No. 2018-086770.

*Primary Examiner* — Christina A Johnson
*Assistant Examiner* — Xue H Liu
(74) *Attorney, Agent, or Firm* — Birch, Stewart, Kolasch & Birch, LLP (57) ABSTRACT

A method for preparing a compact of resin compound comprising the following steps (a) to (c):
(a) a preparation step of mounting a sheet-shaped or block-shaped compact of resin compound including a resin composition, which contains a filler having magnetic anisotropy and is solidified by curing or by being advanced to a B-stage, on a transportation unit which is movable in the horizontal direction, and covering at least a top surface of the compact of resin compound with a cover material;
(b) a step of applying a magnetic field to the compact of resin compound obtained in the step (a) with a bulk superconductor magnet having a central magnetic flux density of 1 T or more; and
(c) a step of moving the compact of resin compound in the horizontal direction and scanning it while applying vibrations to the compact of resin compound mounted on a region of a central part of the bulk superconductor magnet under application of a magnetic field.

10 Claims, 7 Drawing Sheets

(51) Int. Cl.
*C08K 3/04* (2006.01)
*C08K 7/02* (2006.01)
*C08L 63/00* (2006.01)
*C08L 83/04* (2006.01)
*B29C 43/00* (2006.01)
*B29K 401/00* (2006.01)
*B29K 507/04* (2006.01)
*B29K 509/08* (2006.01)
*B29K 505/02* (2006.01)
*B29K 63/00* (2006.01)
*B29K 83/00* (2006.01)

(52) U.S. Cl.
CPC ................ *C08K 7/02* (2013.01); *C08L 63/00* (2013.01); *C08L 83/04* (2013.01); *B29C 2043/568* (2013.01); *B29K 2063/00* (2013.01); *B29K 2083/00* (2013.01); *B29K 2401/00* (2013.01); *B29K 2505/02* (2013.01); *B29K 2507/04* (2013.01); *B29K 2509/08* (2013.01); *B29K 2995/0008* (2013.01)

(58) Field of Classification Search
CPC ............ B29K 2083/00; B29K 2401/00; B29K 2505/02; B29K 2507/04; B29K 2509/08; B29K 2995/0008
USPC .................................................. 264/402, 435
See application file for complete search history.

(56) References Cited

FOREIGN PATENT DOCUMENTS

| | | | |
|---|---|---|---|
| JP | 2000-141505 A | 5/2000 |
| JP | 2004-255600 A | 9/2004 |
| JP | 2006-312677 A | 11/2006 |
| JP | 2006-335957 A | 12/2006 |
| JP | 2012-251054 A | 12/2012 |
| JP | 2014-124785 A | 7/2014 |

* cited by examiner

METHOD FOR PREPARING COMPACT OF RESIN COMPOUND HAVING ANISOTROPY

CROSS-REFERENCE TO RELATED APPLICATION

This non-provisional application claims priority under 35 U.S.C. § 119(a) on Patent Application No. 2018-086770 filed in Japan on Apr. 27, 2018, the entire contents of which are hereby incorporated by reference.

TECHNICAL FIELD

The present invention relates to a method for preparing a compact of resin compound having magnetic anisotropy.

BACKGROUND ART

In recent years, resins used in automobiles, airplanes, and solar batteries are demanded to have higher performance in various aspects. In particular, resins containing fillers having high anisotropy are gaining attention in recent years. For example, bodies of airplanes and automobiles require high strength and lightweight members, so that resins containing carbon fibers and cellulose nanofibers are receiving attention and under development. Additionally, as transparent materials replacing ITO, resins containing silver nanowire, and high thermally-conductive resins containing scaly boron nitride for TIM use are under development. However, these materials achieve high function based on properties of fillers, but the use of their anisotropy can achieve further high performance such as high strength. Thorough utilization of anisotropy of fillers requires the technique of control of arrangement and orientation of fillers in resins.

Examples of these methods include a method of using flowing of a resin (Patent Document 1). In the method using flowing at the time of injection, fibers are oriented in accordance with flowing in the mold during injection molding, so that complete control of orientation in a specific shape is difficult. It is particularly difficult to make a thin sheet-shaped molded article in which fibers are oriented in the planar direction. Additionally, the usable resin is limited to those having high flowability.

Other examples include a method of using an electric field (Patent Document 2). The method using an electric field facilitates control of orientation, but requires a high voltage, so that the method is not suitable to prepare an oriented resin while ensuring safety.

Other examples also include a method using a magnetic field (Patent Documents 3 to 5). Patent Document 3 and Patent Document 4 disclose methods of preparing compacts of resin compound including oriented anisotropic fillers using a superconducting coil magnet of 10 T is disclosed. However, these methods are not suitable to orient resin fillers larger than the size of the hole of the coil of superconducting coil magnet. Additionally, the magnet has a tubular structure, and thus is not suitable for orientation other than vibrations by air vibrations, such as contact with an ultrasonic transducer. Additionally, the apparatus is expensive and its continuous production is difficult, so that mass production and cost reduction of compacts of resin compounds are difficult. Patent Document 5 discloses a method of orienting ferromagnetic substance-coated carbon fibers in a resin by applying vibrations to the resin under application of a magnetic field with a normal conducting coil magnet. However, a normal conducting coil magnet has a small magnetic flux density, and cannot achieve sufficient orientation without covering the filler with a ferromagnetic substance, which markedly imposes limitations on the cost and properties or the material.

Therefore, a method of using a bulk superconductor magnet is suggested. The bulk superconductor magnet can maintain a strong magnetic field of 4 T to 20 T only with cooling, has a simple and compact structure, and can be used like an ordinary permanent magnet. However, the bulk superconductor magnet has a problem that a strong magnetic field is emitted from its central part, but the magnetic field becomes weak and oblique just by slightly deviating from the center. Therefore, the method is unsuitable for preparing a large anisotropic material such as a sheet-shaped compact of 30 cm square.

CITATION LIST

Patent Document 1: JP-A 2014-124785
Patent Document 2: JP-A 2006-312677
Patent Document 3: JP-A 2004-255600
Patent Document 4: JP-A 2006-335957
Patent Document 5: JP-A 2000-141505

SUMMARY OF THE INVENTION

The present invention has been accomplished in view of the above-described circumstances, and it is therefore an object of the present invention to provide a method for preparing an anisotropic compact of resin compound using a bulk superconductor magnet allowing continuous molding and enlargement.

As a result of dedicated research by the inventors, they found that a method for preparing an anisotropic compact of resin compound using a bulk superconductor magnet allowing continuous molding and enlargement, including applying vibrations to an uncured compact in a magnetic field in the central part of the bulk superconductor magnet, and scanning in the horizontal direction. More specifically, they found that magnetization of a bulk superconductor magnet raises the magnetic flux density in the central part perpendicular to the magnet surface, and a large or long tape-shaped compact of resin compound in which a filler having magnetic anisotropy is oriented in one direction is made by moving the compact of resin compound under application of ultrasonic vibrations to the compact of resin compound in the region having a parallel, uniform, and strong magnetic field, and thus has accomplished the present invention.

Specifically, the present invention provides a method for preparing a compact of resin compound wherein in which a filler having magnetic anisotropy are oriented in one direction, including the following steps (a) to (c).

A method for preparing a compact of resin compound in which a filler having magnetic anisotropy is oriented in one direction, the method including the following steps (a) to (c):

(a) a preparation step of mounting a sheet-shaped or block-shaped compact of resin compound including a resin composition, which contains a filler having magnetic anisotropy and is solidified by curing or by being advanced to a B-stage by heat, light, or an electron beam, on a transportation unit which is movable in the horizontal direction, and covering at least a top surface of the compact of resin compound with a cover material having a thickness of less than 5 mm;

(b) a step of applying a magnetic field to the compact of resin compound obtained in the step (a) with a bulk superconductor magnet having a central magnetic flux density of 1 T or more; and (c) a step of moving the compact of resin compound in the horizontal direction and scanning it while applying vibrations to the compact of resin compound mounted on a region of a central part of the bulk superconductor magnet under application of a magnetic field.

In a preferred embodiment of the method of the invention, the filler is at least one filler selected from the group consisting of fibrous substances, nanotube substances, plate-shaped or columnar substances, crystalline inorganic substances, and crystalline organic substances.

In another preferred embodiment, the filler is at least one filler selected from the group consisting of cellulose nanofibers, carbon fibers, alumina fibers, aluminum nitride whiskers, metal nanowire, carbon nanotubes, boron nitride nanotubes, scaly boron nitride, plate-shaped flocculation boron nitride, scaly graphite, graphene, and plate-shaped alumina.

In yet another preferred embodiment, in the step (a), the cover material is a film having a thickness of 2 mm or less, or a non-ferromagnetic metal sheet.

In yet another preferred embodiment, in the step (c), a magnetic field is applied to the compact of resin compound through a film having a thickness of 2 mm or less.

In still another preferred embodiment, a compact of resin compound to be obtained has a sheet shape having a thickness of 5 mm or less.

In a further preferred embodiment, the resin composition is a silicone resin composition, and also the resin composition is an epoxy resin composition which is in a liquid state at 25° C., and further the resin composition is an epoxy resin composition which has a softening point of 40 to 150° C., and is in a solid state at 25° C.

Furthermore, the present invention provides a method for preparing a compact of resin compound, including the above steps (a) to (c), which is followed by a step (d) wherein the scanned compact of resin compound is cured or advanced to a B-stage by heat, light, or an electron beam.

Advantageous Effects of the Invention

According to the preparing method of the present invention, an anisotropic compact of resin compound which allows continuous molding and enlargement can be obtained, as a method for preparing an anisotropic compact of resin compound using a bulk superconductor magnet.

DESCRIPTION OF THE PREFERRED EMBODIMENTS

The preparing method of the present invention is further described below in detail.

Resin Composition

The present invention relates to a method of molding a resin composition including a filler having magnetic anisotropy. The resin composition is selected from thermosetting resin compositions, light (UV) curable resin compositions, or electron radiation curable resin compositions. These resin compositions may be used in the form of a liquid, a solid, or a semi-solid in an uncured state at room temperature (25° C.), or may be used in a form solidified through curing or advancement to a B-stage by heating or irradiation such as UV laser and electron beam laser.

In the present invention, "advancement to a B-stage" means semi-curing of a resin composition.

The resin composition includes a curable resin and the below-described filler having magnetic anisotropy as essential components.

The curable resin is not particularly limited, and its examples include thermosetting silicone resins, thermosetting epoxy resins, UV curable epoxy resins, UV curable silicone resins, and electron beam curable silicone resins, among them, thermosetting silicone resins are preferred. The curable resin may be a resin which is in a liquid state at room temperature or has a softening point at 40 to 150° C., and is in a solid state at 25° C. When a resin having a softening point of 40 to 150° C. and being in a solid state at 25° C. is used, the resin is preferably heated to a temperature not lower than the softening point of the resin during scanning.

Filler Having Magnetic Anisotropy

The magnetic anisotropic filler included in the resin composition is a material which has crystallomagnetic anisotropy and/or shape magnetic anisotropy, and is oriented in one direction under application of a magnetic field. The control of the orientation of the filler in one direction imparts anisotropy to the resin composition, and improves its strength, electric conductivity, heat conductivity, and piezoelectric properties.

Illustrative examples of the material having crystallomagnetic anisotropy include crystalline inorganic substances and crystalline organic substances such as organic substance single crystals. Illustrative examples of the material having shape magnetic anisotropy include fibrous substances such as cellulose nanofibers, carbon fibers, alumina fibers, aluminum nitride whiskers, and metal nanowires; nanotube substances such as carbon nanotubes and boron nitride nanotubes; and plate-shaped or columnar substances such as scaly boron nitride, plate-shaped flocculation boron nitride, scaly graphite, graphene, and plate-shaped alumina. Among them, fibrous substances, or plate-shaped or columnar substances are preferred, and carbon fibers are particularly preferred. In order to improve strength of the resin cured product, a material having no magnetic anisotropy, such as spherical silica, may be used together with the above filler having magnetic anisotropy.

The amount of the filler having magnetic anisotropy, although not particularly limited, is from 10 to 1,000 parts by weight, and preferably from 10 to 300 parts by weight, per 100 parts by weight of the curable resin in the resin composition.

Details about Preparing Method

In the next place, an example of the preparing method of the present invention is specifically described using FIGS. 1 to 5.

Step (a)

Figure 2:
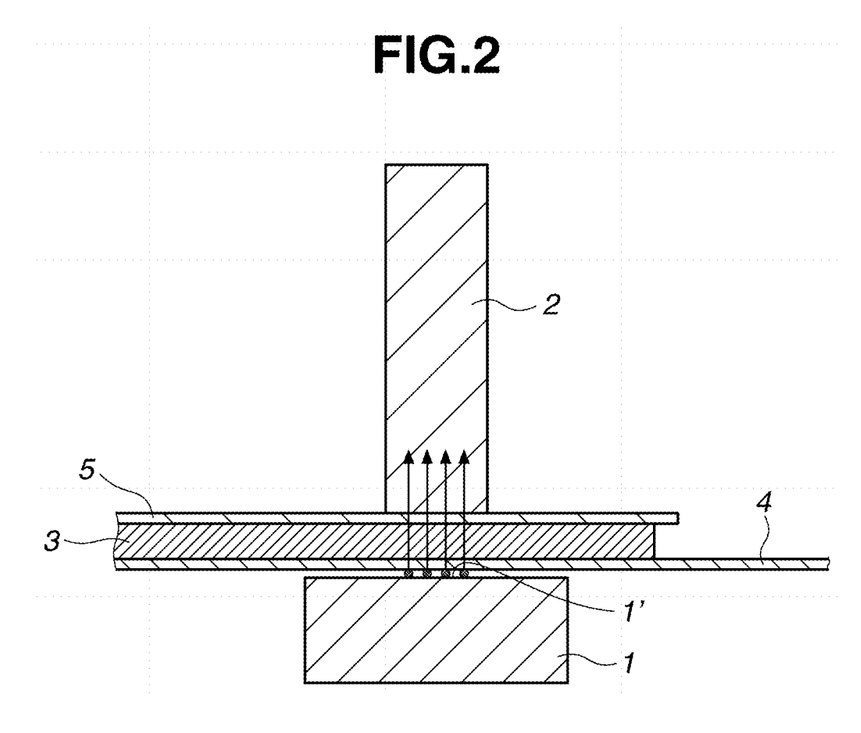
FIG. 2 is a side view showing the schematic structure of the apparatus used in the preparing method according to one embodiment of the present invention.
Figure 3:
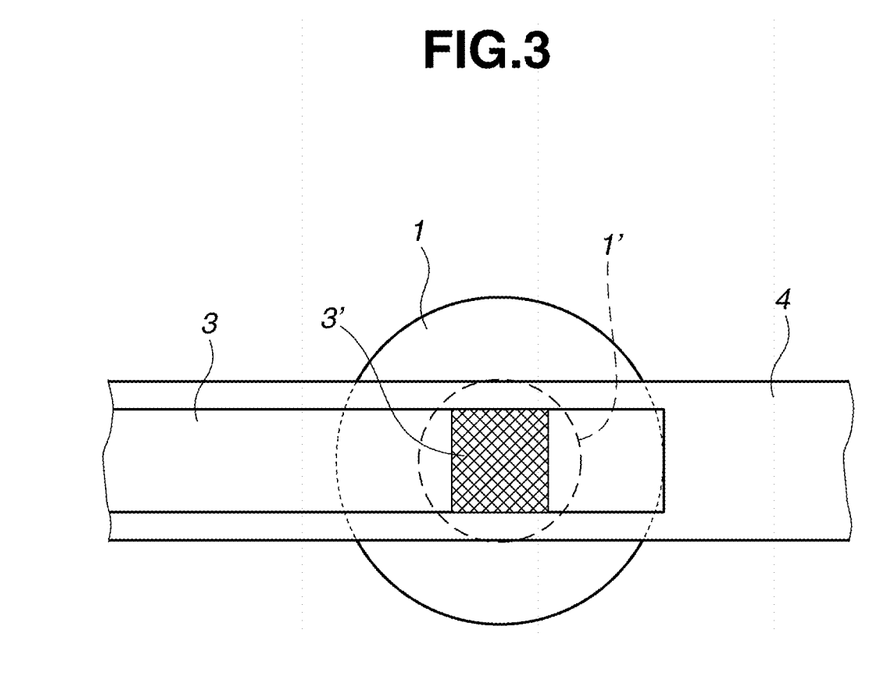
FIG. 3 is a plan view showing the schematic structure of the apparatus used in the preparing method according to one embodiment of the present invention.

Firstly, as the process (a), as shown in FIG. 2, a sheet-shaped or block-shaped compact of resin compound 3 made of the above-described resin composition is placed on a transportation unit 4 which can be moved in the horizontal direction. A resin film or a nonmagnetic metal thin plate is preferably used for the transportation unit 4. Illustrative examples of the resin film include polyethylene terephthalate (PET) film, polyethylene film, polytetrafluoroethylene (PTFE) film, and polytrifluorochloroethylene (PCTFE) film, and illustrative examples of the nonmagnetic metal thin plate include an aluminum sheet, a non-magnetic stainless steel sheet, a copper sheet, and a titanium sheet. Among them, the use of a PET film is preferred. The thickness of the transportation unit 4 is preferably 0.5 mm or less. The transportation unit having a thickness of 0.5 mm or less is preferred because it reduces the influence of attenuation of magnetic field. The method of transporting the compact of resin compound using the transportation unit 4 is not particularly limited; for example, a film or thin plate as the transportation unit is rewound for moving the compact of resin compound.

Additionally, at least the top of the compact of resin compound is covered with a cover material 5. Exposure of the resin composition without covering with the cover material is not preferred because it makes it difficult to apply the below-described ultrasonic vibrations, and the surface of the resin may be waved to have an uneven thickness by applying the ultrasonic vibrations. The cover material, although not particularly limited, is preferably a member selected from resin films or non-ferromagnetic metal sheets. Illustrative examples of the resin film include a polyethylene terephthalate (PET) film, a polyethylene film, a polytetrafluoroethylene (PTFE) film, and a polytrifluorochloroethylene (PCTFE) film. Illustrative examples of the non-ferromagnetic metal sheet include an aluminum sheet, a non-magnetic stainless steel sheet, a copper sheet, and a titanium sheet. Among them, a PET film is preferred from the viewpoints of handleability and price. At least one side of the cover material may be treated to impart releasability. It is necessary that the thickness of the cover material be less than 5 mm, particularly preferably 2 mm or less. The cover material with a thickness of less than 5 mm is preferred because it sufficiently transmits ultrasonic vibrations to the central part. The materials of the transportation unit and the cover material may be identical or different.

The method for forming or shaping the compact of resin compound is not particularly limited as to its method and order, as long as at least the top surface of the compact of resin compound is covered with the cover material 5, and the compact of resin compound is mounted on the transportation unit 4. For example, an object made by injecting the resin composition into a sheet-shaped or block-shaped mold, and covering the top surface of the mold with a cover material may be mounted on the transportation unit. Alternatively, the resin composition may be pinched between a film or thin plate and a cover material of the transportation unit 4, and extended into a sheet shape with a roll. In this case, the surrounding of the resin is preferably sealed with, for example, a double-sided adhesive tape so as not to leak the resin outside.

Step (b)

Figure 4:
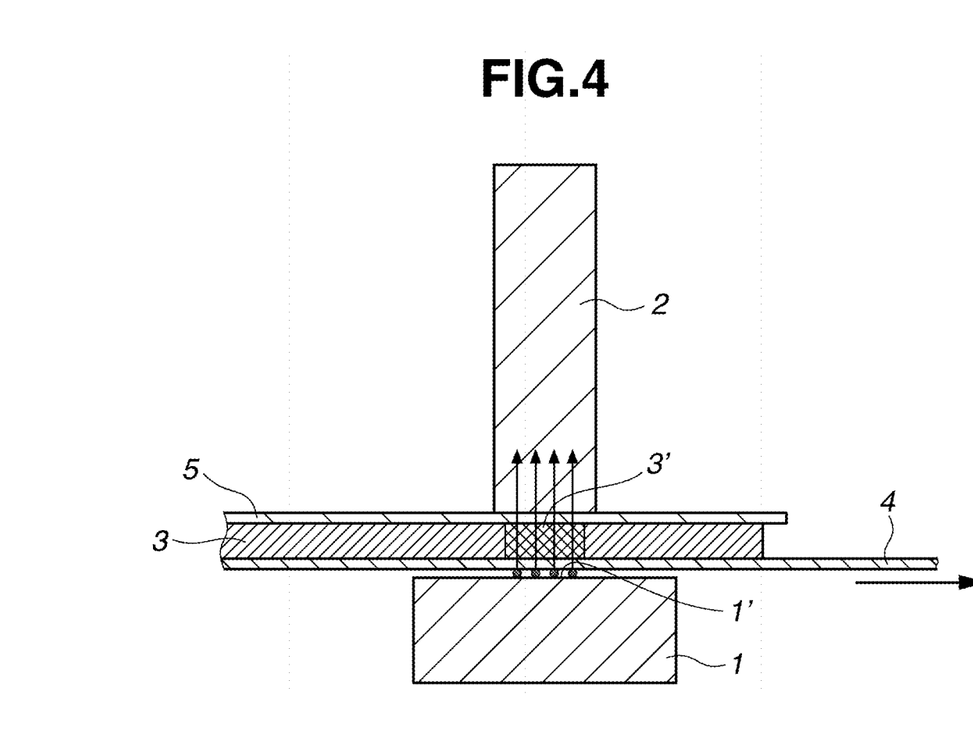
FIG. 4 illustrates the manner of applying a magnetic field to the resin composition and preparing an anisotropic resin composition by ultrasonic vibrations in the schematic structure of FIG. 2.

Subsequently, as the step (b), as shown in FIG. 4, a magnetic field is applied to a part of the compact of resin compound, which has been prepared in the step (a), using the bulk superconductor magnet 1. From the viewpoint of intensity of the magnetic field, the distance between the compact of resin compound and the bulk superconductor magnet 1 is preferably as short as possible.

FIG. 2 is a side view showing the schematic structure of the apparatus used in the preparing method according to an embodiment of the present invention. In FIG. 2, the numeral 1 indicates a bulk superconductor magnet which applies a magnetic field to a part of the compact of resin compound 3. The numeral 2 indicates an ultrasonic transducer which applies vibrations to a central part 1' of the bulk superconductor magnet.

The bulk superconductor magnet magnetizes a superconductor under a magnetic field such as a superconducting coil, and is used as a magnetic pole. Once the magnet is magnetized, it has a semi permanently strong magnetic flux density under cooling. The magnet has a simple structure, and can be used like an ordinary permanent magnet. Therefore, when a superconducting coil magnet is used, an apparatus having a complicated structure can be built. Additionally, the magnet is low-cost, and allows further enlargement and increase of magnetic field.

Illustrative examples of the method for magnetizing the bulk superconductor magnet include pulse magnetization, and magnetization with a superconducting coil magnet. Among them, magnetization with a superconducting coil magnet is preferred from the viewpoint of the size of the magnetic flux density to be captured. The magnetic flux density of the superconducting coil magnet used for magnetization is preferably 6 T or more. If the density is smaller than 6 T, the magnetic flux density of the bulk superconductor magnet after magnetization may be insufficient.

Figure 1:
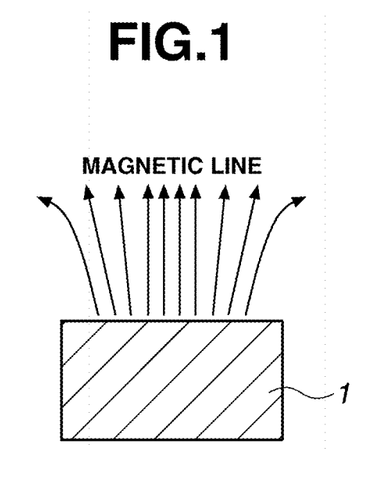
FIG. 1 is a schematic view illustrating the magnetic flux density of a bulk superconductor magnet.

As illustrated in FIG. 1, normally the magnetic field of the bulk superconducting magnet is strong only in its central part and is perpendicular to the surface. In the present invention, "the central part" of the bulk superconducting magnet means the region in which the magnetic flux density around the center of the bulk superconducting magnet is 1 T or more. The magnetic flux density of the central part to be actually used is 1 T or more, preferably 2 T or more, and more preferably 3 T or more. If a region having a magnetic flux density smaller than 1 T is used for orientation, orientation of the filler may be insufficient.

Illustrative Examples of the superconductor used in the bulk superconducting magnet, although not particularly limited, include a RE-Ba—Cu—O (where RE is at least one selected from among Y, Sm, Nd, Yb, La, Gd, Eu, and Er), $MgB_2$, $NbSn_3$, and iron superconductor. From the viewpoints of the cost and easiness of the preparing method, and intensity of the magnetic flux density, the RE-Ba—Cu—O is more preferred.

The bulk superconductor magnet is not particularly limited as to its shape and size, and preferably has a disc shape having a diameter of at least 4 cm, from the viewpoint of easiness of magnetization and the range of the available magnetic field.

Step (c)

Subsequently, in the step (c), as shown in FIG. 4, ultrasonic vibrations are applied by the ultrasonic transducer 2 to the compact of resin compound on the central part of the bulk superconductor magnet.

In the preparing method of the present invention, the bulk superconductor magnet has a high magnetic flux density in its central part, and uses only the region in which the direction of the magnetic line is uniform, so that vibrations are applied only to the central part of the magnet. Application of vibrations to the compact of resin compound in the magnetic field region of the central part of the bulk superconductor magnet immobilizes the anisotropic filler which is oriented in the region of the parallel, uniform, and strong magnetic field.

Vibrations in the preparing method of the present invention are used for orienting the magnetic anisotropic filler in the resin composition in a narrow region, and preparing the compact of resin compound 3' including the oriented filler. Normally, a filler having magnetic anisotropy will not be oriented only by application of a strong magnetic field, and requires promotion by vibrations. More specifically, a filler having magnetic anisotropy causes orientation only when both of a magnetic field and vibrations are applied to the filler. Therefore, in the preparing method of the present invention, the region subjected to application of a magnetic field and vibrations is scanned in the horizontal direction all over the compact of resin compound, thereby preparing a continuous region in the compact of resin compound in which the filler is oriented.

Figure 5:
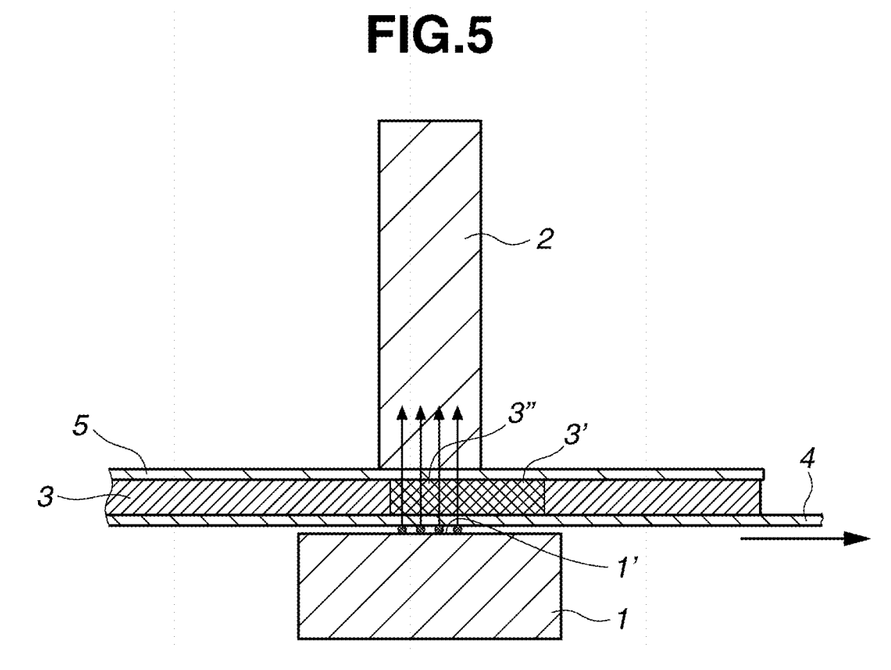
FIG. 5 illustrates the manner of applying a magnetic field to the resin composition and curing an anisotropic resin composition by ultrasonic vibrations in the schematic structure of FIG. 2, followed by moving the resin composition, and curing the anisotropic resin composition by ultrasonic vibrations in the adjacent part.

In the preparing method of the present invention, the embodiment of vibrations to be used include vibrations by hitting, vibrations by an air oscillator, acoustic wave vibrations, and air vibrations. Among them, the use of vibrations having a frequency higher than 5,000 Hz is preferred, and among them, the use of ultrasonic vibrations with a frequency of 20 kHz or higher from the viewpoints of easy availability of the apparatus, and allowing orientation in a thin film state. The application with an ultrasonic transducer may be carried out in the state of the compact of resin compound heated. The vibrations may be applied in any direction to the compact, and is preferably applied downward from the top surface, from the viewpoint of easiness of orientation. Furthermore, as shown in FIG. 5, the region of the numeral 3' is moved by the transportation unit 4 so as to go out the range subjected to ultrasonic vibrations, and then ultrasonic vibrations are applied to the adjacent compact of resin compound, thereby preparing a resin 3" in which the filler in the resin composition composing the compact is oriented. This operation is repeated (scanned), thereby orienting the filler in the whole of the resin composition in one direction. Application of a magnetic field and vibrations and transportation of the compact of resin compound can be carried out step by step or continuously. The speed of moving the compact of resin compound by the transportation unit 4 for continuously applying ultrasonic vibrations to the compact of resin compound depends on the shape and size of the compact of resin compound, and is preferably adjusted at from 0.1 to 100 mm/second, and more preferably from 3 to 20 mm/second.

When ultrasonic is applied outside the central part of the bulk superconductor magnet, problems such as that the filler will not be oriented or obliquely oriented because the magnetic field is so weak, so that ultrasonic vibrations are applied to a region smaller than the region having a magnetic flux density of 1 T or more in the central part of the bulk superconductor magnet. In this case, the region subjected to the ultrasonic application is preferably from 3 to 100%, more preferably from 10 to 50% of the central part of the bulk superconductor magnet (a magnetic flux density of 1 T or more).

Step (d)

Subsequently, in the step (d), the oriented compact of resin compound may be further cured by reaction or advanced to a B-stage, thereby preparing an orientated compact of resin compound. The compact of resin compound can be used in an anisotropic conductive sheet, an anisotropic thermally conductive sheet and the like.

EXAMPLES

The preparing method of the present invention is specifically describe below with reference to Examples and Comparative Examples, but the present invention will not be limited to the following Examples.

The viscosity described in the following Examples and Comparative Examples is the measurement at 25° C. measured using a rotational viscometer described in JIS K 7117-1:1999.

The bulk superconductor magnet used herein was that having a Gd—Ba—Cu—O composition and a diameter of 6 cm. Using a superconducting coil magnet of 6.5 T, that magnetized to have a center magnetic flux density of 4.5 T, a magnetic flux density of 3 T at a radius of 1 cm from the center, a magnetic flux density of 2 T at a radius of 2 cm from the center, a magnetic flux density of 1 T at a radius of 2.5 cm from the center, and a magnetic flux density of 0.1 or less T at a radius of 3 cm from the center was used. The ultrasonic transducer used herein was that having a terminal diameter of 10 mm and a frequency of 20 kHz.

Example 1

A resin composition prepared by mixing 100 parts by weight of a thermosetting liquid silicone resin composition (viscosity: 0.4 Pa·s) and 100 parts by weight of carbon fiber a (average length: 100 µm) was applied to a releasable 100-µm-thick PET film in the range of 30 cm×30 cm at a thickness of 1 mm. After application, the resin composition was covered with a 100-µm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 100 µm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 2

A resin composition prepared by mixing 100 parts by weight of a thermosetting liquid silicone resin composition (viscosity: 0.4 Pa·s) and 150 parts by weight of carbon fiber a (average length: 100 µm) was applied to a releasable 100-µm-thick PET film in the range of 30 cm×30 cm at a thickness of 1 mm. After application, the resin composition was covered with a 100-µm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 100 µm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 3

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 100-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 100 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 4

A resin composition prepared by mixing 100 parts by weight of a thermosetting liquid silicone resin composition (viscosity: 0.4 Pa·s) and 100 parts by weight of carbon fiber c (average length: 250 μm) was applied to a releasable 100-μm-thick PET film in the range of 30 cm×30 cm at a thickness of 1 mm. After application, the resin composition was covered with a 100-μm-thick PET film, the surrounding was closed with a double-side tape so as not to leak the resin, thus preparing a compact of resin compound. An end of the resin composition was placed on the central part of the bulk superconductor magnet. After initiation of application of ultrasonic vibrations from the top of the 100 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 5

A resin composition prepared by mixing 100 parts by weight of a thermosetting liquid silicone resin composition (viscosity: 50 Pa·s) and 100 parts by weight of carbon fiber a (average length: 100 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 300 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 6

A resin composition prepared by mixing 100 parts by weight of a thermosetting liquid silicone resin composition (viscosity: 0.4 Pa·s) and 100 parts by weight of boron nitride a (average particle size: 15 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 300 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 7

A resin composition prepared by mixing 100 parts by weight of a thermosetting epoxy resin composition, which has a softening point of 60° C. and is a solid at 25° C., and 100 parts by weight of carbon fiber b (average length: 150 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 300 μm-thick film in the central part of the magnet with the resin heated at 100° C., the filmy compact of resin compound was moved at a speed of 5 mm/second, and the whole of the filmy compact of resin compound was scanned. Thereafter, the resin was cooled to room temperature, thereby obtaining a resin sheet. A cross section of the cured product was observed with a SEM photograph.

Example 8

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 0.3 mm. After application, the resin composition was covered with a 300-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 300 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a resin sheet. A cross section of the cured product was observed with a SEM photograph.

Example 9

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 1 cm×200 cm at a thickness of 1 mm. After application, the resin composition was covered with a 300-μm-thick PET film, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the 300 μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a tape-shaped resin sheet. A cross section of the cured product was observed with a SEM photograph.

Example 10

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 2-mm-thick aluminum sheet, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the aluminum sheet in the central part of the magnet, the filmy compact of resin compound was moved at a speed of 5 mm/second, and the whole of the filmy compact of resin compound was scanned. Thereafter, the compact of resin compound was cured, thereby obtaining a tape-shaped resin sheet. A cross section of the cured product was observed with a SEM photograph.

Comparative Example 1

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 5-mm-thick aluminum sheet, the surrounding was closed with a double-side tape so as not to leak the resin, thus preparing a compact of resin compound. An end of the compact of resin compound was placed on the central part of the bulk superconductor magnet. After initiation of application of ultrasonic vibrations from the top of the aluminum sheet in the central part of the magnet, the filmy compact of resin compound was moved at a speed of 5 mm/second, and the whole of the filmy compact of resin compound was scanned. Thereafter, the compact of resin compound was cured, thereby obtaining a tape-shaped resin sheet. A cross section of the cured product was observed with a SEM photograph.

Comparative Example 2

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. An end of the compact of resin compound was placed on the central part of the bulk superconductor magnet. After initiation of application of ultrasonic vibrations in the central part of the magnet without using a film, the filmy compact of resin compound was moved at a speed of 5 mm/second, and the whole of the filmy compact of resin compound was scanned, but the resin layer collapsed because of contact with the ultrasonic.

Comparative Example 3

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin, thus preparing a compact of resin compound. An end of the compact of resin compound was placed on the central part of a neodymium magnet. The neodymium magnet had a magnetic flux density of 0.8 T at a central radius of 1 cm. After initiation of application of ultrasonic vibrations from the top of the 300-μm-thick film in the central part of the magnet, the filmy compact of resin compound was moved at a speed of 5 mm/second, and the whole of the filmy compact of resin compound was scanned. Thereafter, the compact of resin compound was cured, thereby obtaining a tape-shaped resin sheet. A cross section of the cured product was observed with a SEM photograph.

Comparative Example 4

A resin composition prepared by mixing 100 parts by weight of a thermosetting liquid silicone resin composition (viscosity: 0.4 Pa·s) and 100 parts by weight of carbon fiber a (average length: 100 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin. An end of the compact of resin compound was placed on the central part of the bulk superconductor magnet. Thereafter, the filmy compact of resin compound was moved at a speed of 5 mm/second without application of ultrasonic vibration, and the whole of the filmy compact of resin compound was scanned. Thereafter, the compact of resin compound was cured, thereby obtaining a resin sheet. A cross section of the cured product was observed with a SEM photograph.

Comparative Example 5

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin. An end of the compact of resin compound was placed on the central part of the bulk superconductor magnet. Thereafter, the filmy compact of resin compound was moved at a speed of 5 mm/second without application of ultrasonic vibration, and the whole of the filmy compact of resin compound was scanned. Thereafter, the compact of resin compound was cured, thereby obtaining a resin sheet. A cross section of the cured product was observed with a SEM photograph.

Comparative Example 6

A resin composition prepared by mixing 100 parts by weight of a thermosetting liquid silicone resin composition (viscosity: 0.4 Pa·s) and 100 parts by weight of carbon fiber b (average length: 150 μm) was applied to a releasable 100-μm-thick PET film in the range of 30 cm×30 cm at a thickness of 1 mm. After application, the resin composition was covered with a 300-μm-thick PET film, the surrounding was closed with a double-side tape so as not to leak the resin. An end of the compact of resin compound was placed on the central part of the bulk superconductor magnet. After initiation of application of ultrasonic vibrations from the top of the 300-μm-thick film in the central part of the magnet using an oscillator thickened with an aluminum bar having a diameter of 6 cm, then the filmy compact of resin compound was moved at a speed of 5 mm/second without application of ultrasonic vibration, and the whole of the filmy compact of resin compound was scanned. Thereafter, the compact of resin compound was cured, thereby obtaining a resin sheet. A cross section of the cured product was observed with a SEM photograph.

Figure 6:
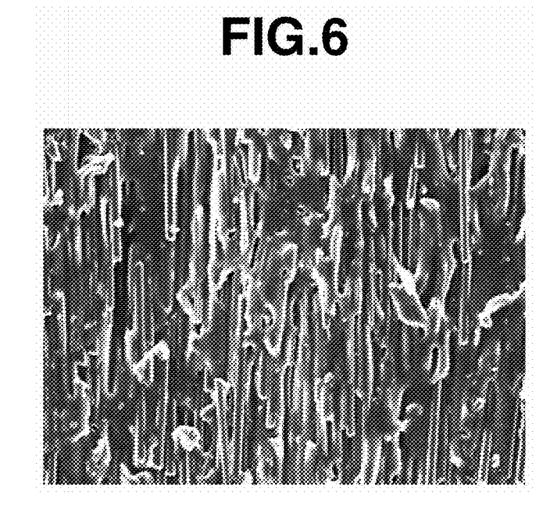
FIG. 6 is a SEM image of a cross section of the sheet obtained in Example 3.
Figure 7:
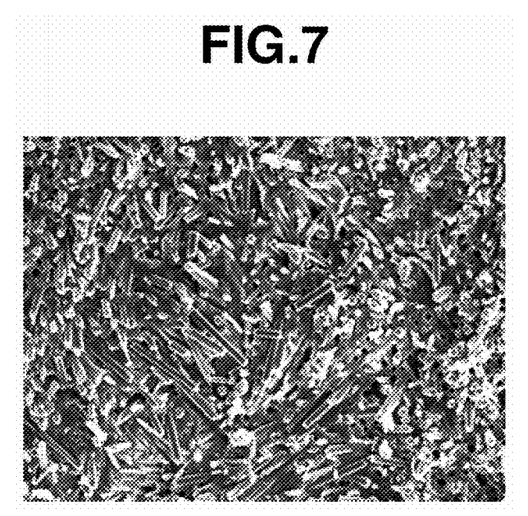
FIG. 7 is a SEM image of a cross section of the sheet obtained in Comparative Example 6.

For the above-described Examples 1 to 10 and Comparative Examples 1 to 6, from the SEM photographs of the cross sections of the resin cured products, the average of the major axis of the carbon fibers, or the average of the degree formed by the surface direction of boron nitride and the sheet surface were calculated, and the average orientation angle was determined. The results are shown in Table 1 and Table 2. The SEM images of the cross sections obtained in Example 3 and Comparative Example 6 are shown in FIG. 6 and FIG. 7, respectively.

TABLE 1

| Component (amount: part by weight) | | Example 1 | 2 | 3 | 4 | 5 | 6 | 7 | 8 | 9 | 10 |
|---|---|---|---|---|---|---|---|---|---|---|---|
| Resin | (a) Thermosetting liquid silicon resin | 100 | 100 | 100 | 100 | 100 | 100 | | 100 | 100 | 100 |
| | (b) Thermosetting epoxy resin | | | | | | | 100 | | | |
| Anisotropic filler | (a) Carbon fiber a | 100 | 150 | | | 100 | | | | | |
| | (b) Carbon fiber b | | | 100 | | | | 100 | 100 | 100 | 100 |
| | (c) Carbon fiber c | | | | 100 | | | | | | |
| | (d) Boron nitride a | | | | | | 100 | | | | |
| Viscosity of resin composition (Pa·s) | | 50 | 200 | 270 | 280 | 200 | 250 | — | 270 | 270 | 270 |
| Sheet shape (width × height, cm) | | 30 × 30 | 30 × 30 | 30 × 30 | 30 × 30 | 30 × 30 | 30 × 30 | 30 × 30 | 30 × 30 | 1 × 200 | 30 × 30 |
| Magnetic flux density (T) | | 4 - 3 | 4 - 3 | 4 - 3 | 4 - 3 | 4 - 3 | 4 - 3 | 4 - 3 | 4 - 3 | 4 - 3 | 4 - 3 |
| Cover material | | 100-μm-thick PET | 100-μm-thick PET | 100-μm-thick PET | 100-μm-thick PET | 300-μm-thick PET | 300-μm-thick PET | 300-μm-thick PET | 300-μm-thick PET | 300-μm-thick PET | 2-mm-thick aluminum sheet |
| Thickness of resin sheet (mm) | | 1 | 1 | 1 | 1 | 1 | 1 | 1 | 0.3 | 1 | 1 |
| Application of ultrasonic vibration | | Applied | Applied | Applied | Applied | Applied | Applied | Applied | Applied | Applied | Applied |
| Sheet condition | | Sheet including continuously oriented filler | Sheet including continuously oriented filler | Sheet including continuously oriented filler | Sheet including continuously oriented filler | Sheet including continuously oriented filler | Sheet including continuously oriented filler | Sheet including continuously oriented filler | Sheet including continuously oriented filler | Tape shaped sheet including continuously oriented filler | Tape shaped sheet including continuously oriented filler |
| Average orientation angle (°) | | 78 | 83 | 90 | 91 | 83 | 65 | 80 | 81 | 90 | 67 |

TABLE 2

| Component (amount: part by weight) | | Comparative Example | | | | | |
|---|---|---|---|---|---|---|---|
| | | 1 | 2 | 3 | 4 | 5 | 6 |
| Resin | (a) Thermosetting liquid silicon resin | 100 | 100 | 100 | 100 | 100 | 100 |
| | (b) Thermosetting epoxy resin | | | | | | |
| Anisotropic filler | (a) Carbon fiber a | | | | 100 | | |
| | (b) Carbon fiber b | 100 | 100 | 100 | | 100 | 100 |
| | (c) Carbon fiber c | | | | | | |
| | (d) Boron nitride a | | | | | | |
| Viscosity of resin composition (Pa · s) | | 270 | 270 | 270 | 50 | 270 | 270 |
| Sheet shape (width × height, cm) | | 30 × 30 | 30 × 30 | 30 × 30 | 30 × 30 | 30 × 30 | 30 × 30 |
| Magnetic flux density (T) | | 4 - 3 | 4 - 3 | 0.8 | 4 - 3 | 4 - 3 | 4 - 3 |
| Cover material | | 5-mm-thick aluminum sheet | None | 300-μm-thick PET | 300-um-thick PET | 300-μm-thick PET | 300-μm-thick PET |
| Thickness of resin sheet (mm) | | 1 | 1 | 1 | 1 | 1 | 1 |
| Application of ultrasonic vibration | | Applied | Application of ultrasonic vibrations is impossible | Applied | Not applied | Not applied | Applied (the range of vibrations is wide) |
| Sheet condition | | Filler is not oriented | | Filler is not oriented | Filler is not oriented | Filler is not oriented | Filler is not oriented |
| Average orientation angle (°) | | 32 | | 13 | 11 | 11 | 34 |

The results in Table 1 and Table 2 demonstrate the followings.

When the preparing method of the present invention is used as in Examples 1 to 8, a large anisotropic resin composition is simply obtained. Furthermore, scanning with ultrasonic vibrations and a magnetic field continuously and quickly provide a large, long tape-shaped, or thin film anisotropic resin composition.

Additionally, as in Example 7, scanning of a resin under heating allows to obtain an oriented sheet resin of a thermosetting epoxy resin on a B-stage.

Furthermore, as in Example 9, an elongated tape-shaped resin can be continuously oriented.

On the other hand, when the oscillator is thickened as in Comparative Example 6, the orientation angle markedly decreases. The reason for this is likely that vibrations are applied in a region having a small magnetic flux density, and this clarifies the usefulness of application of vibrations in the central part of the present invention.

Inversely, if no vibration is applied, or vibrations are attenuated by using a thick aluminum sheet as the cover material, the filler will not be oriented.

Japanese Patent Application No. 2018-086770 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a compact of resin compound in which a filler having magnetic anisotropy is oriented in one direction, the method comprising the following steps (a) to (c):
   (a) a preparation step of mounting a sheet-shaped or block-shaped compact of resin compound including a resin composition, which contains a filler having magnetic anisotropy and is solidified by curing or being advanced to a B-stage by heat, light, or an electron beam, on a transportation unit which is movable in the horizontal direction, and covering at least a top surface of the compact of resin compound with a cover material having a thickness of less than 5 mm;
   (b) a step of applying a magnetic field to the compact of resin compound obtained in the step (a) with a bulk superconductor magnet having a central magnetic flux density of 1 T or more; and
   (c) a step of moving the compact of resin compound in the horizontal direction and scanning it while applying vibrations to the compact of resin compound mounted on a region of a central part of the bulk superconductor magnet under application of a magnetic field.

2. The method for preparing a compact of resin compound according to claim 1, wherein the filler is at least one filler selected from the group consisting of fibrous substances, nanotube substances, plate-shaped or columnar substances, crystalline inorganic substances, and crystalline organic substances.

3. The method for preparing a compact of resin compound according to claim 1, wherein the filler is at least one filler selected from the group consisting of cellulose nanofibers, carbon fibers, alumina fibers, aluminum nitride whiskers, metal nanowire, carbon nanotubes, boron nitride nanotubes, scaly boron nitride, plate-shaped flocculation boron nitride, scaly graphite, graphene, and plate-shaped alumina.

4. The method for preparing a compact of resin compound according to claim 1, wherein in the step (a), the cover material is a film having a thickness of 2 mm or less, or a non-ferromagnetic metal sheet.

5. The method for preparing a compact of resin compound according to claim 1, wherein in the step (c), a magnetic field is applied to the compact of resin compound through a film having a thickness of 2 mm or less.

6. The method for preparing a compact of resin compound according to claim 1, wherein a compact of resin compound to be obtained has a sheet shape having a thickness of 5 mm or less.

7. The method for preparing a compact of resin compound according to claim 1, wherein the resin composition is a silicone resin composition.

8. The method for preparing a compact of resin compound according to claim 1, wherein the resin composition is an epoxy resin composition which is in a liquid state at 25° C.

9. The method for preparing a compact of resin compound according to claim 1, wherein the resin composition is an epoxy resin composition which has a softening point of 40 to 150° C., and is in a solid state at 25° C.

10. A method for preparing a compact of resin compound, comprising the steps (a) to (c) according to claim 1, followed by a step (d) wherein the scanned compact of resin compound is cured or advanced to a B-stage by heat, light, or an electron beam.

* * * * *